(12) United States Patent
Ferraz

(10) Patent No.: US 9,456,325 B2
(45) Date of Patent: Sep. 27, 2016

(54) TRANSMISSION OF A MULTIMEDIA MESSAGE DOUBLED WITH THE TRANSMISSION OF A TEXT MESSAGE

(71) Applicant: STREAMWIDE, Paris (FR)

(72) Inventor: Antoni Ferraz, Villers S/Marne (FR)

(73) Assignee: Streamwide, Paris (FR)

( * ) Notice: Subject to any disclaimer, the term of this patent is extended or adjusted under 35 U.S.C. 154(b) by 0 days.

(21) Appl. No.: 14/766,042

(22) PCT Filed: Jan. 23, 2014

(86) PCT No.: PCT/FR2014/050132
§ 371 (c)(1),
(2) Date: Aug. 5, 2015

(87) PCT Pub. No.: WO2014/125183
PCT Pub. Date: Aug. 21, 2014

(65) Prior Publication Data
US 2015/0382166 A1 Dec. 31, 2015

(30) Foreign Application Priority Data
Feb. 12, 2013 (FR) ...................................... 13 51195

(51) Int. Cl.
*H04W 4/18* (2009.01)
*H04L 12/58* (2006.01)
(Continued)

(52) U.S. Cl.
CPC .............. *H04W 4/18* (2013.01); *H04L 51/066* (2013.01); *H04L 51/10* (2013.01); *H04L 51/30* (2013.01); *H04L 69/28* (2013.01); *H04W 4/12* (2013.01); *H04W 4/14* (2013.01); *H04W 88/02* (2013.01)

(58) Field of Classification Search
CPC ....... H04W 4/18; H04W 4/12; H04W 88/02; H04L 51/30; H04L 51/10; H04L 51/066; H04L 69/28; H04E 4/14
See application file for complete search history.

(56) References Cited

U.S. PATENT DOCUMENTS 7,103,333 B2   9/2006 Lazaridis et al.
8,001,386 B2   8/2011 Goodman et al.
(Continued)

FOREIGN PATENT DOCUMENTS

WO   WO 2014/125183   8/2014

OTHER PUBLICATIONS

International Search Report and Written Opinion dated Mar. 13, 2014 re Application No. PCT/FR2014/050132.
(Continued)

*Primary Examiner* — Brandon Miller
(74) *Attorney, Agent, or Firm* — Frost Brown Todd LLC

(57) ABSTRACT

The invention relates to the management of the wait for a notification of an acknowledgment of receipt M_AR, used by a first terminal T1 that has sent a multimedia message MM to a second terminal T2. Said management involves a method in which the terminal T1 measures a period of waiting for the notification of acknowledgment of receipt M_AR of the multimedia message MM sent to the terminal T2. If the waiting period exceeds a predetermined threshold, the terminal T generates a text message M_SMS for notifying the availability of the multimedia message MM, to be sent the terminal T2. The method provides the deletion of text messages M_SMS received by the terminal T2, when they are duplicates of the multimedia messages MM. The invention further claims a computer system and program for implementing the method. Said management is particularly useful in instant messaging.

8 Claims, 3 Drawing Sheets

Figure 1:
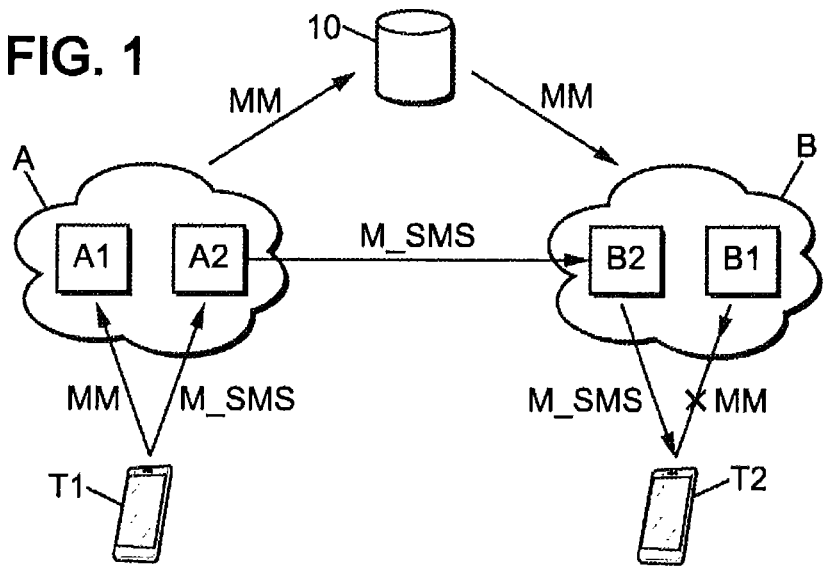

(51) Int. Cl.
*H04W 4/12* (2009.01)
*H04W 4/14* (2009.01)
*H04L 29/06* (2006.01)
*H04W 88/02* (2009.01)

(56) References Cited

U.S. PATENT DOCUMENTS

| | | | | |
|---|---|---|---|---|
| 2004/0157590 | A1* | 8/2004 | Lazaridis | H04L 29/12301 455/415 |
| 2008/0172561 | A1* | 7/2008 | Goodman | G06F 21/606 713/176 |
| 2010/0093381 | A1* | 4/2010 | Maguire | G06Q 10/107 455/466 |
| 2014/0162706 | A1* | 6/2014 | Daly | H04W 4/12 455/466 |

OTHER PUBLICATIONS

French Preliminary Search Report and Written Opinion dated Nov. 5, 2013 re Application No. FR 1351195.

"3rd Generation Partnership Project; Technical Specification Group Terminals; Multimedia Messaging Service (MMS); Functional description; Stage 2 (Release 5)", 3GPP Standard 3GPP TS 23.140, 3rd Generation Partnership Project (3GPP), Mobile Competence Centre; 650, Route Des Lucioles; F-06921 Sophia-Antipolis Cedex; France, No. V5.3.0, Jun. 1, 2002, pp. 1-155, XP050362814, 156 pgs.

De Santis, A., et al., "An Extensible Framework for Efficient Secure SMS", Complex, Intelligent and Software Intensive Systems (CISIS), 2010 International Conference on, IEEE, Piscataway, NJ, USA, Feb. 15, 2010, pp. 843-850, XP031657747, 8pgs.

* cited by examiner

TRANSMISSION OF A MULTIMEDIA MESSAGE DOUBLED WITH THE TRANSMISSION OF A TEXT MESSAGE

The present invention relates to transmission of a multimedia message between two terminals, particularly mobile terminals.

It relates more particularly to the management of the wait for a notification of an acknowledgment of receipt, carried out by the terminal that sent the multimedia message.

The term "multimedia message" is understood to mean a message, including but not limited to instant messages within an instant messaging service, containing one or more types of multimedia content such as image, video, audio, or other.

Existing telecommunications terminals can transmit multimedia messages or files via multimedia data networks provided for this purpose, such as GPRS, EDGE, H, H+, 3G, 4G, WiFi, and the Internet. Multimedia messages can be sent as an electronic mail message (email), or by a multimedia messaging service (MMS) or instant messaging service (IM) application, or by a client-server application over an Internet type of network.

In multimedia messaging service (MMS) applications, a notification text message containing a URL address for accessing via the Internet a message or multimedia file stored on a server, is sent to the destination terminal if, for example, the terminal is not compatible with these applications or if it is not able to receive MMS messages.

Also known are instant messaging service applications on mobile phone platforms using SMS to send text messages instead of multimedia messages when the messaging service is not accessible via the multimedia data network. For example, if a first terminal (the sender) is located in an area that does not allow multimedia data transmission or access to a multimedia data network, it sends a text message to the second terminal (the recipient) via SMS over the conventional GSM/CDMA network. An SMS type of text message may also be sent by the first terminal if it is unable to access the instant messaging service.

Some instant messaging service applications implement "presence" systems which indicate to a first terminal that a recipient second terminal is connected to the service. It could be set up so that when the presence system indicates the second terminal is not connected to the service, then the first terminal sends a text message by SMS to the second terminal.

However, this type of management for sending/receiving text or multimedia messages has at least one disadvantage.

The user of the terminal receiving multimedia messages has to connect to a multimedia network in order to be notified that new multimedia messages have been received. As long as the user cannot connect to this network, he or she has no knowledge that multimedia messages are waiting. It could be set up so that the destination terminal of a multimedia message also receives a text message indicating that the multimedia message is available. However, this acknowledgment system would result in duplicate messages on the second terminal when the multimedia message and the notification text message indicating receipt of the multimedia message are received.

In addition, presence systems are unreliable. They may erroneously indicate to the first terminal that the second terminal is not connected to the service. The first terminal would then send an SMS message to the second terminal when it would be possible to send a multimedia message. Conversely, they may erroneously indicate to the user of the first terminal that the second terminal is connected to the service. The first terminal would then send a multimedia message to the second terminal which is not connected to the instant messaging service, and the user of the second terminal has no knowledge of the multimedia message received.

The present invention improves the situation.

For this purpose, it proposes a method for transmitting a multimedia message from a first terminal to a second terminal, wherein a notification of an acknowledgement of receipt, from the second terminal to the first terminal, is provided by the second terminal for said multimedia message. In particular, in this method:

the first terminal measures a period of waiting for the notification of acknowledgement of receipt, and
if said waiting period exceeds a predetermined threshold, the first terminal generates a text message to be sent to the second terminal.

Typically, the text message can be sent over a network not requiring the resources of a network capable of transferring multimedia content.

Thus, in one possible embodiment, the multimedia message is transmitted via a first telecommunications network, and said text message is transmitted by the first terminal via a second network.

Such an embodiment can advantageously provide improved reliability and usability for the user of a terminal, due to the optimized use of two types of networks, for example a network for multimedia data (data for example) for the first network and a conventional network (GSM/CDMA for example) for the second network. If a multimedia message is sent by a first terminal to a second terminal that has no access to the first type of network (for multimedia data), the second terminal can still receive a notification text message indicating a multimedia message is available, via the second type of network.

In one embodiment, the text message includes availability information concerning the multimedia message, for the second terminal.

For example, depending on whether the first terminal has access to a conventional network or to a multimedia network, the method according to this embodiment of the invention sends a text message and/or a multimedia message, regardless of any information from unreliable presence systems. Thus, if the first terminal has access to a multimedia network it always sends a multimedia message to the second terminal; the system of implementing on the first terminal a period of waiting for an acknowledgment may, if the waiting period for receipt of the acknowledgement exceeds a predetermined threshold, automatically send an availability notification text message (for example an SMS message) to the second terminal, informing it that a multimedia message is available, via a second network to ensure delivery of the message by this second channel. Such an embodiment offers more reliable delivery of text messages as it offers greater connectivity coverage than the use of a single network.

The connection status can be interpreted, for example, by an application implemented on the first terminal. This automatically switches to the available network, the order of preference being "data" network over "GSM/CDMA" network for example, to send a message of text only.

The user of the first terminal thus receives efficient and reliable feedback on the delivery status of the text or multimedia messages the user has sent.

In a non-limiting example, the invention has an advantageous application in the management of instant messaging (or "chat") including multimedia content and supported by a dedicated server.

In such an embodiment, the multimedia message is a message in an instant messaging application, and is intended to travel between the first and second terminals via a dedicated server.

In one particular embodiment, the first terminal assigns an identifier to each multimedia message. Preferably, in the absence of acknowledgment of receipt of a multimedia message after the waiting period, the first terminal assigns to a generated text message a signature of the identifier of said multimedia message. Thus, upon receipt of a text message, the second terminal can then compare the signature of the text message to at least one identifier contained in a multimedia message received by the second terminal, and if they match, the second terminal deletes the text message received.

In such an optional but preferred embodiment, the second terminal thus deletes text messages notifying that multimedia messages are available when these multimedia messages have been received by the second terminal.

By filtering out the display of the excess SMS messages received for multimedia messages, the second terminal carries out an efficient deletion of availability notification text messages considered as duplicates of multimedia messages. Signature verification thus allows efficient deletion of duplicates and guarantees a marked improvement in usability.

The invention also relates to a system comprising at least a first terminal and a second terminal, for transmitting a multimedia message from the first terminal to the second terminal, the second terminal comprising means for sending a notification, from the second terminal to the first terminal, of acknowledgement of receipt of the multimedia message by the second terminal, wherein the first terminal comprises:
  means for measuring a period of waiting for the notification of acknowledgement of receipt,
  means for comparing the waiting period to a predetermined threshold, and
  means for generating a text message to be sent to the second terminal if the period exceeds said threshold.

The invention also relates to a telecommunications terminal, comprising:
  means for measuring a waiting period for the notification of acknowledgement of receipt of a multimedia message sent to a third party terminal,
  means for comparing the waiting period to a predetermined threshold,
  and means for generating a text message to be sent to the third party terminal if the period exceeds said threshold.

The invention also relates to a computer program comprising instructions for implementing the general method of the invention, when executed by a processor of a terminal of the aforementioned type. The general algorithm of such a program can be represented by a flowchart such as the one in FIG. 4, discussed below.

It also relates to a telecommunications terminal specifically for the embodiment in which a deletion of duplicate text messages is implemented, such a terminal comprising:
  means, which become active upon receipt of a text message, for comparing a signature contained in the text message and an identifier contained in a multimedia message received, and
  means for deleting said text message received, which become active if the signature and the identifier match.

The invention also relates to a second computer program comprising instructions for implementing the deletion of duplicates, when executed by a processor of a terminal of the aforementioned type. The general algorithm of such a program can be represented by a flowchart such as the one in FIG. 5, discussed below. This second computer program may be a routine of the computer program for implementing the general method of the invention.

The computer program for implementing the general method of the invention may, for example, be in the form of a specific plugin for a general software application, for example such as an application specific to an instant messaging service installed on each terminal. This application, when thus enriched, provides automatic management of the two types of networks as well as management of duplicates (in an optional but advantageous embodiment) and of acknowledgments of receipt of text messages (SMS messages for example) or multimedia messages sent or received.

In order to interact with the two types of messages (SMS and multimedia), the application integrates both the multimedia instant messaging service and an SMS messaging service that is generally native to the first or second terminal, which allows intercepting/accessing the SMS message transmission/reception/storage functionalities. The application also integrates management of the network access status, which allows it to use said second network (GSM/CDMA for example) for text messages when said first network (data) is not available. Such integration within the first terminal and/or second terminal allows efficient real-time interpretation of the connection status and the messaging channels available.

Figure 2:
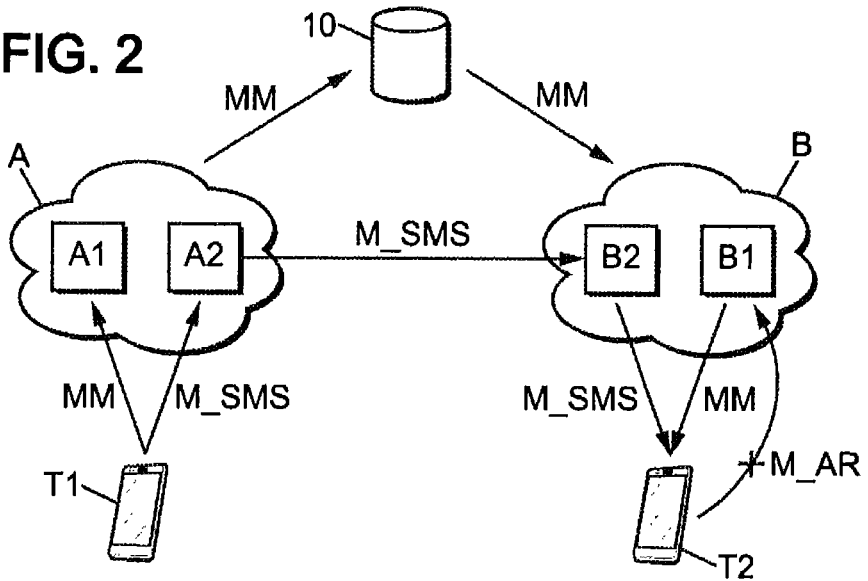
Figure 3:
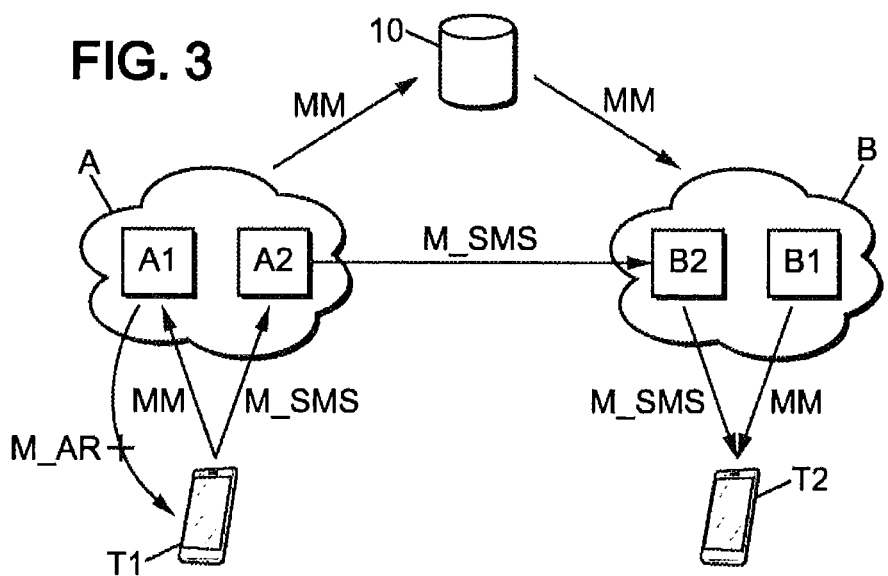
Figure 4:
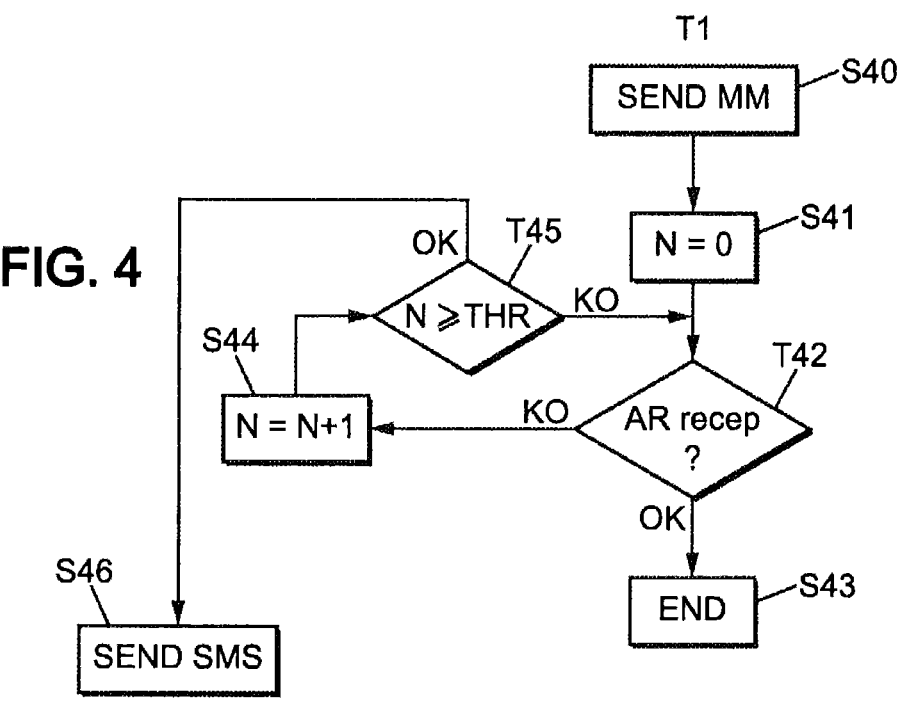
Figure 5:
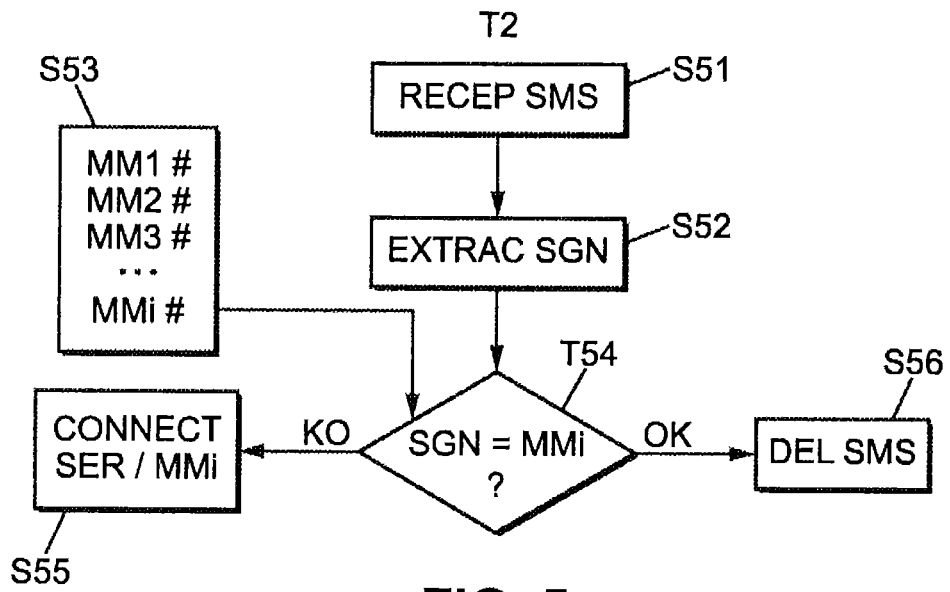
Figure 6:
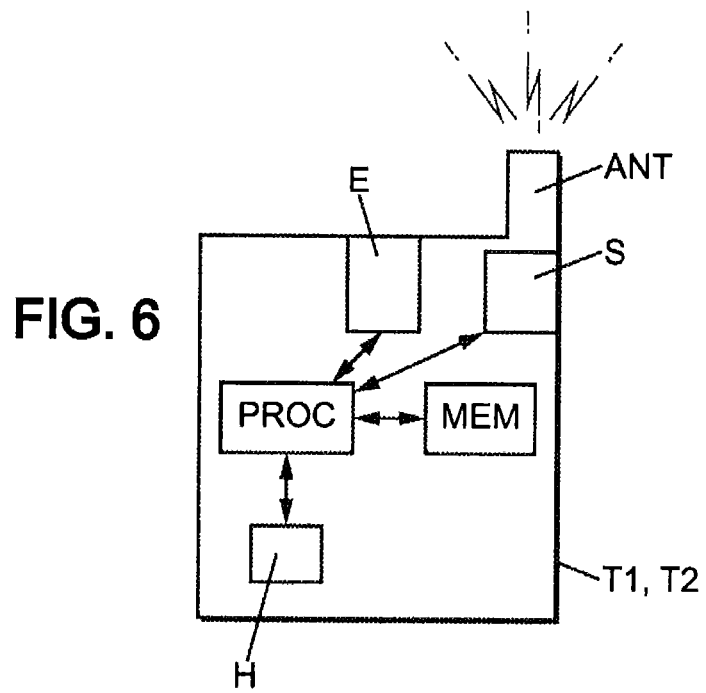

Other features and advantages of the invention will be apparent from reading the following detailed description of some exemplary embodiments of the invention and from reviewing the drawings, in which:

FIG. 1 illustrates a first multimedia message transmission scenario that requires sending an SMS message after a waiting period, as the second terminal does not have access to an appropriate network, FIG. 2 illustrates a second multimedia message transmission scenario that requires sending an SMS message after a waiting period, due to the first terminal failing to receive an acknowledgment as the second terminal does not have access to an appropriate network, FIG. 3 illustrates a third multimedia message transmission scenario that requires sending an SMS message after a waiting period, due to the first terminal failing to receive an acknowledgment as the first terminal does not have access to an appropriate network, FIG. 4 illustrates an embodiment of a method implementing a waiting period in the sense of the invention, in the first terminal, FIG. 5 illustrates an embodiment of a method implementing a deletion of duplicate SMS messages in the second terminal, in one embodiment of the invention, FIG. 6 schematically illustrates the elements of a terminal for implementing a method according to any one of the scenarios of FIGS. 1 to 3.

We first refer to FIG. 1, in which a system according to the invention comprises:
  a first terminal T1 connected to a multimedia network A1 and a conventional network A2 managed by a telecommunications carrier A, a second terminal T2 connected to a multimedia network B1 and conventional network B2 managed by a telecommunications carrier B, and, in the example described here, an instant messaging server 10.

Here, the term mobile or telecommunications "terminal" is understood to mean a device such as a mobile phone, a smartphone, a tablet, etc., typically comprising (referring to FIG. 6) an input signal E and an output signal S which are connected to an antenna ANT and to a processor PROC associated with working memory MEM. A clock H internal or external to the processor and connected to the processor is also provided, in one embodiment, for implementing the procedure for said waiting period.

The application implemented on the terminals in this embodiment, described below, is an instant messaging application. The term "instant messaging server" is therefore understood to mean a dedicated server able to receive and transmit instantaneously, and possibly to store and manage, multimedia messages between two terminals on which an instant messaging application resides, via a multimedia network. It can typically be incorporated into an instant messaging platform composed of the dedicated server 10, with a software application making use of the server via one or more communication networks.

The term "multimedia network" as used above is understood to mean any communication network that uses a set of communication protocols, possibly based on packet transfer, able to carry multimedia data such as text, sound, speech, images, and/or video. These include protocols such as GPRS, EDGE, UMTS, 3G, 4G, WiFi, WIMAX, Internet, etc.

Here, the term "conventional network" is understood to mean any communication network that uses a set of communication protocols, able to carry text data primarily. These include protocols such as GSM (2G) (for "Global System for Mobile Communications"), CDMA, etc.

In what follows, it should be noted that carrier B may be the same carrier as A.

The terminals T1 and T2 make use of an instant messaging application, in cooperation with the dedicated server 10 which handles the transmission of multimedia content packaged as instant messages exchanged between the terminals T1 and T2.

In scenario 1, the destination terminal T2 does not have access to the multimedia type network B1. Terminal T1 sends a multimedia message MM via the multimedia network A1 to terminal T2. As the latter does not receive the multimedia message MM from the instant messaging server 10, it does not send terminal T1 an acknowledgment M_AR that the multimedia message MM was received. The instant messaging application implements a waiting period in the sense of the invention. In the scenario illustrated in FIG. 1, the predetermined waiting period for notification of an acknowledgment of receipt of the multimedia message MM for terminal T1 has been exceeded, and terminal T1 sends a text message M_SMS in the form of an SMS message via the conventional network A2 to terminal T2. The text message M_SMS contains availability information concerning the multimedia message MM to inform the user of terminal T2 that a multimedia message MM is available when access to the multimedia network B1 is established. When the second terminal T2 accesses the multimedia network B1, it receives the multimedia message MM and possibly performs a deletion of redundant messages (as described below with reference to FIG. 5).

Each multimedia message MM is sent with a unique identifier MMi. The identifier is generated by the instant messaging application software before or concurrently with the sending of the multimedia message, and incorporates data concerning the pair of sending T1 and receiving T2 terminals.

In an exemplary embodiment, an identifier may be provided that comprises for example:
 a local identifier of terminal T1 (for example a telephone number in E.164 format), and/or
 a local identifier of terminal T2, and/or
 an identifier ID of the instant messaging service IM (or platform).

The identifier MMi is preferably short and with the fewest possible characters, in order to limit the size increase to the multimedia and SMS messages.

If, after waiting, an acknowledgment of receipt of the multimedia message MM does not reach terminal T1 within a predetermined waiting period (a few minutes for example), the notification text message M_SMS which is sent as an SMS message, contains a signature SGN of the unique identifier MMi.

Each identifier and each identifier signature of a message received by terminal T2 is stored in the memory MEM of terminal T2 in a dedicated table (denoted S53 in FIG. 5). When the identifier MMi of a multimedia message MM actually received by terminal T2 and stored in memory is identical to the identifier MMi issuing from a text message M_SMS signature (denoted SGN in FIG. 5 and discussed below) received at a later time, the text message M_SMS is removed. Such an embodiment allows efficient deletion of duplicates and provides a significantly enhanced user experience.

FIG. 2 shows a system comprising elements similar to those shown in FIG. 1. Identical references denote similar components. In this scenario, the first terminal sends a multimedia message 21 to the second terminal T2. Terminal T2 receives the multimedia message MM but the acknowledgment M_AR is not sent to terminal T1 due to terminal T2 not having access to the multimedia network. The waiting in the meaning of the invention is implemented in terminal T1. If the predetermined period of waiting for the notification of acknowledgement of receipt of the multimedia message MM by terminal T1 is exceeded, then terminal T1 sends a text message M_SMS in the form of an SMS message via the conventional network A2 to terminal T2. Deletion of redundant messages can be performed on terminal T2. In this scenario, the text message M_SMS is instantly removed because terminal T2 had received the multimedia message MM in the typical manner during the waiting by terminal T1. In this scenario, the user of terminal T2 is not inconvenienced by receiving the text message M_SMS concerning the availability notification 22, as this message is unnecessary.

FIG. 3 represents a system comprising elements similar to those shown in FIGS. 1 and 2. Identical references designate similar components. In this scenario, the first terminal sends a multimedia message MM to the second terminal T2. Terminal T2 receives the multimedia message MM and sends the acknowledgment M_AR of receipt of the multimedia message to terminal T1 via the multimedia network. Here, terminal T1 does not have access to the multimedia network. It therefore cannot receive the acknowledgment. The wait in terminal T1 is then started, and after the waiting period is exceeded with no acknowledgment received, terminal T1 causes an availability notification SMS message M_SMS to be sent to terminal T2 via the conventional network A2. The deletion of redundant messages is applied in terminal T2 and the text message M_SMS is deleted. In this scenario, the user of terminal T2 therefore is unaware of the availability notification text message M_SMS that was received.

FIG. 4 illustrates an embodiment of the method which makes use of a waiting period in the meaning of the invention, in the first terminal T1. In step S40, terminal T1 sends a multimedia message MM. A loop counter N is initialized in step S41. A test step T42 checks whether the acknowledgment of receipt has reached terminal T1 ("AR Recep"). If such is the case (OK arrow), the process ends (END) in step 43. However, if the acknowledgment has not been received in test step T42 (KO arrow), a timer loop begins which consists of steps S44 and T45, respectively consisting for example of adding a time unit (for example from the clock H of FIG. 6) to the counter N=N+1 (step S44) and comparing the counter N with a selected time threshold THR (test T45), for example 15 seconds and with a selected time threshold THR of 2 minutes. If the value of the counter N reaches or exceeds the value of the time threshold THR (OK arrow), terminal T1 sends an SMS message in step S46. Otherwise (KO arrow), the process returns to test step T42 to determine whether the acknowledgment of receipt has arrived.

Referring now to FIG. 5, a process of deleting duplicate SMS messages is carried out on terminal T2, following the non-receipt by terminal T1 of the acknowledgement of receipt of the multimedia message after the waiting period, and after the sending to terminal T2 by terminal T1 of the availability notification SMS message concerning the multimedia message MM.

In step S51, terminal T2 thus receives the notification text message ("RECEP SMS"). In step S52, the identifier signature SGN of the multimedia message MM is extracted from said notification SMS message. Terminal T2 contains a table of identifiers MM1#, MM2#, MM3#, . . . , MMi#, where each identifier MMi of each multimedia message actually received is stored. This identifier table is stored in the memory of terminal T2 and is updated each time a new multimedia message reaches terminal T2.

In test step T54, the identifier table is accessed in step S53 in order to compare the identifier signature SGN of the multimedia message MM received, with the identifiers in said table. When a match is found between the signature SGN and one of the identifiers MMi (OK arrow from test T54), the received SMS message is removed. Otherwise (KO arrow) in step S55, terminal T2 displays the text message to inform the user of terminal T2 of the availability of a multimedia message MM. In one embodiment, the text message M_SMS may include an activatable link containing the identifier MMi of the multimedia message MM, such that activation of said link (for example included in a URL address) causes terminal T2 to request the multimedia message from the messaging server 10 (in an embodiment where the server 10 stores messages or multimedia content at least temporarily for example) via the multimedia network B1.

Of course, the invention is not limited to the embodiment described above; it extends to other variants.

It is understood that the list of scenarios presented above is in no way limiting. In one scenario not represented in the drawings, the first terminal can send a text message to the second terminal through an instant messaging application via the multimedia network. If the second terminal does not receive the text message, and ultimately sends no acknowledgment to the first terminal, the waiting period step of the invention may be carried out. However, a text message (an SMS message for example) may still be sent after the waiting period, in this scenario in the form of a multimedia message with no multimedia content (only retaining the text of the multimedia message). In this case, the text message sent via the conventional network by SMS is not an availability notification as in previous scenarios, but is the text message itself, within the limits on the number of characters allowed in SMS messages.

It is possible that the second terminal did not receive the multimedia message for reasons other than a lack of access to the multimedia network. For example, if the messaging server fails, it is not able to transmit the multimedia message or acknowledge its receipt, or both. In these cases in particular, the user of the second terminal is still notified by SMS message of the availability of the multimedia message, and the user of the first terminal receives the acknowledgment of receipt of the notification SMS message.

Of course, the text message, which is an SMS message in the above description, may be in another form of message, although still purely textual.

The invention claimed is:

1. A method for transmitting a multimedia message from a first terminal to a second terminal, wherein notification of an acknowledgement of receipt, from the second terminal to the first terminal, is provided by the second terminal for said multimedia message, wherein:
    the first terminal measures a period of waiting for the notification of acknowledgment of receipt,
    if said waiting period exceeds a predetermined threshold, the first terminal generates a text message to be sent to the second terminal,
    the first terminal assigns an identifier to each multimedia message,
    the first terminal, in the absence of acknowledgment of receipt of a multimedia message after the waiting period, assigns to a generated text message a signature of the identifier of said multimedia message,
    upon receiving a text message, the second terminal compares the signature of the text message to at least one identifier contained in a multimedia message received by the second terminal, and if they match, the second terminal removes said text message received.

2. The method according to claim 1, wherein the multimedia message is transmitted via a first telecommunications network, and said text message is transmitted by the first terminal via a second network.

3. The method according to claim 1, wherein the text message is an SMS message.

4. The method according to claim 1, wherein the text message includes availability information concerning the multimedia message, for the second terminal.

5. The method according to claim 1, wherein the multimedia message is a message in an instant messaging application, and said multimedia message is intended to travel between the first and second terminals via a dedicated server.

6. A system comprising at least a first terminal and a second terminal, for transmitting a multimedia message from the first terminal to the second terminal, the second terminal comprising means for sending a notification, from the second terminal to the first terminal, of acknowledgement of receipt of said multimedia message by the second terminal, wherein the first terminal comprises:
    means for measuring a period of waiting for the notification of acknowledgment of receipt,
    means for comparing the waiting period to a predetermined threshold, and means for generating a text message to be sent to the second terminal if the period exceeds said threshold, and wherein:

the first terminal assigns an identifier to each multimedia message, the first terminal, in the absence of acknowledgment of receipt of a multimedia message after the waiting period, assigns to a generated text message a signature of the identifier of said multimedia message, upon receiving a text message, the second terminal compares the signature of the text message to at least one identifier contained in a multimedia message received by the second terminal, and if they match, the second terminal removes said text message received.

7. A telecommunications terminal comprising:

means for measuring a waiting period for a notification of acknowledgment of receipt of a multimedia message sent to a third party terminal, means for comparing the waiting period to a predetermined threshold, and means for generating a text message to be sent to the third party terminal if the period exceeds said threshold, means, which become active upon receipt of a text message, for comparing a signature contained in the text message and an identifier contained in a multimedia message received, and means for deleting said text message received, which become active if the signature and the identifier match.

8. A non-transitory computer readable storage medium, having stored thereon a computer program comprising instructions for implementing the method according to claim 1, when executed by a processor of a telecommunications terminal comprising:

means for measuring a waiting period for a notification of acknowledgment of receipt of a multimedia message sent to a third party terminal, means for comparing the waiting period to a predetermined threshold, means for generating a text message to be sent to the third party terminal if the period exceeds said threshold, means, which become active upon receipt of a text message, for comparing a signature contained in the text message and an identifier contained in a multimedia message received, and means for deleting said text message received, which become active if the signature and the identifier match.

* * * * *